United States Patent [19]

Kasahara

[11] Patent Number: 5,260,849
[45] Date of Patent: Nov. 9, 1993

[54] ELECTROSTATIC ATTRACTING SHEET

[75] Inventor: Keiji Kasahara, Shizuoka, Japan

[73] Assignee: Abisare Co., Ltd., Kakegawa, Japan

[21] Appl. No.: 931,427

[22] Filed: Aug. 24, 1992

Related U.S. Application Data

[62] Division of Ser. No. 530,306, May 29, 1990, abandoned.

[30] Foreign Application Priority Data

Mar. 6, 1990 [JP] Japan .................. 2-55530

[51] Int. Cl.⁵ .............................. H01T 23/00
[52] U.S. Cl. ..................... 361/234; 428/330
[58] Field of Search .......... 361/233, 234; 428/330

[56] References Cited

U.S. PATENT DOCUMENTS

| | | | |
|---|---|---|---|
| 3,916,270 | 10/1975 | Wachter et al. ............ | 361/234 |
| 4,752,525 | 6/1988 | Oyachi et al. ............. | 428/323 |
| 4,933,109 | 6/1990 | Yamada et al. ............ | 252/520 |

FOREIGN PATENT DOCUMENTS

| | | |
|---|---|---|
| 3716116 | 12/1988 | Fed. Rep. of Germany . |
| 55-20830 | 6/1980 | Japan . |
| 57-58872 | 12/1982 | Japan . |
| 62-062872 | 3/1987 | Japan . |
| 63-318568 | 12/1988 | Japan . |
| 2169296 | 6/1986 | United Kingdom . |

OTHER PUBLICATIONS

Abstract of Japanese Patent No. JP-A-63 180 964 to Ricoh published Jul. 26, 1988.
Abstract of Japanese Patent No. JP-A-61 244 547 to Boseki published Oct. 30, 1986.
Abstract of Japanese Patent No. JP-A-58 020 722 to Seisan published Feb. 2, 1983.
Abstract of Japanese Patent No. JP-A-61 241 336 to Nitsukan published Oct. 27, 1986.
Abstract of Japanese Patent No. JP-A-59 006 235 to Seisan published Jan. 13, 1984.

*Primary Examiner*—George F. Lesmes
*Assistant Examiner*—Chris Raimund

[57] ABSTRACT

An electrostatic attracting sheet which is incorporated in X-Y plotters or the like machines in order to attract drawing papers to a supporting board in the machines while the drawing of any given letters and/or figures is done on the drawing papers, the attracting sheet comprising crystal whiskers of potassium titanate which are coated with a white conductive substance such as tin and are dispersed in plastics sheet at a content such that a volume resitivity of an order of $10^{12}$ to $10^{14} \Omega.cm$ is imparted to the sheet, which sheet is made white or light gray due to such white whiskers dispersed therein.

10 Claims, 2 Drawing Sheets

ELECTROSTATIC ATTRACTING SHEET

This application is a divisional of application Ser. No. 07/530,306 filed on May 29, 1990, now abandoned.

BACKGROUND OF THE INVENTION

This invention relates to an electrostatic attracting sheet which is used with a holding plate and is adapted to fix or secure paper sheets in the so-called X-Y plotters, copying machines or the like to the holding sheet for a desired length of time by means of the Coulomb force.

The known electrostatic holding apparatuses utilize the electrostatic Coulomb force in order to attract a paper sheet or other object to be held on the holding apparatuses. Said electrostatic holding apparatuses each comprises an insulating base layer, a pair of electrodes formed thereon and an electrostatic attracting sheet laminated on and covering the base layer and electrodes. The attracting sheet is of a predetermined conductivity or of a limited volume resistivity. In said apparatuses, positive and negative terminals from a power source are connected to the electrodes so as to impart electrostatic charges to the electrostatic attracting sheet. Electric connection between the electrodes and the terminals is to be turned off to peel the paper sheets away from the attracting sheet.

Some examples of the known attracting devices are disclosed in the Japanese Patent Publications TOKKO-SHO-55-20830 and -57-58872.

The electrostatic attracting sheets in said known devices have a structure such that spherical particles of carbon black are dispersed and embedded in a sheet of plastics or synthetic rubber. The extrusion method is used to form the sheets.

However, it has been difficult to disperse the carbon black particles homogeneously in the plastics or synthetic rubber. The attracting sheets made by such a method are disadvantageous because their dispersion is not well controlled but is likely to be influenced by conditions of the mixing of carbon black and/or the forming of the attracting sheet. Thus, they cannot exert their attracting force in a stable manner. In particular, fine spherical particles of carbon black will form bead chains of a kind which is called "structure". It is vaguely assumed that electrons flow through the chains or repeatedly jump from the aggregate particles of carbon black to the surrounding high polymer phases. This mechanism of electron current makes it difficult to obtain an attracting sheet comprising carbon black and having the volume resistivity uniform over its entire surface.

Thus, the values of volume resistivity vary within a wide range notwithstanding a constant amount (% by weight) of carbon black. Therefore, well-controlled stable attracting force falling within a narrow range has not been acquired for the electrostatic attracting sheet.

Therefore, the inventions disclosed in the Japanese Patent Publications are directed to the improvement in which such disadvantages in the known art, are diminished by adding a stabilizing agent, a plasticizer, an anti-aging agent, a lubricant and/or other special additives to the plastics of the attracting sheet. Such additives added to the electrically conducting material are intended to eliminate the bad influences of ambient temperature or humidity in order to stabilize the attracting force.

In spite of such an intention, a well stabilized attracting force of a desirable level has not been achieved up to now. Besides, such special additives have caused a considerable rise in manufacturing cost.

On the other hand, it has been tried to manufacture a white electrostatic attracting sheet by dispersing in the plastics titanium dioxide powder which are coated with tin. The particles are however almost spherical fine crystals, so that they cannot be homogeneously dispersed in such an amount that a satisfactory conductivity is enhanced to the plastics sheet.

SUMMARY OF THE INVENTION

Accordingly, an object of the invention is to provide an electrostatic attracting sheet which is free from such defects that have been inherent to the known attracting sheet.

In particular, the invention was made to provide an electrostatic attracting sheet in which white crystal whiskers are dispersed as a conductive filler in a high polymer substance such as plastics or synthetic rubber, the crystal whiskers (hereinafter referred to as "whiskers") being potassium titanate coated with a white electrically conductive substance, in such a state that the whiskers are distributed in the attracting sheet with their longitudinal axis aligning with a direction in which a surface of the attracting sheet extends.

The white coated whiskers in the attracting sheet in the invention desirably have a diameter of about 0.2 $\mu$m to 0.5 $\mu$m and a length of about 10 $\mu$m to 20 $\mu$m. The content of said white whiskers is from about 2% to 8% by weight of the sheet which is about 0.1 to 0.5 mm thick. The white conductive substance is desirably selected from a group consisting of tin, antimony and nickel. The chemical vapor deposition method (CVD method) may be employed to coat the whiskers with a thin layer of the metal mentioned above. The thickness of said layer may be about 0.01 $\mu$m to 0.1 $\mu$m if the metal is applied at about 30% to 40% by weight of uncoated whiskers.

The plastics in which the conductive filler is dispersed may be ABS-resin, polyurethane resin, acrylic resin, polyamide resin such as nylon, polyacetal resin, polyvinylidene fluoride resin or polyester resin such as polyethylene terephthalate.

Volume resistivity of the electrostatic attracting sheet in the invention should be designed to be an order of $10^{12}$ to $10^{14} \Omega \cdot cm$, by adjusting relevant conditions and characteristics of the sheet or in manufacture thereof.

The kneading process within an extruder causes a shearing stress to such elongate crystal whiskers of potassium titanate which are coated with white conductive substance, the stress quickly producing homogenous dispersion of the filer in the plastics. In the plastics sheet extruded from the extruder, the whiskers dispersed in said plastics form a stable three-dimensional network structure. The longitudinal axes of the conductive filler particles substantially align with a surface direction in which the surface of the attracting sheet extends, as shown in FIG. 2. This state of dispersion makes an electric resistivity in the surface direction lower than that in another direction in which the thickness of attracting sheet extends.

Such a higher resistivity in the direction of thickness provides a good electric insulation of a front surface from a back surface of the attracting sheet. Therefore, a thinner attracting sheet which exerts a higher attracting force can well protect the operator's hand from an electric shock.

Further, it is advantageous that the content of white coated whiskers as the conductive filler in the invention can be reduced to one half of the content of carbon black in the known attracting sheet. The volume resistivity of the order of $10^{12}$ to $10^{14}\Omega.cm$ can be stably obtained notwithstanding such a lower content of the whiskers.

Thus, the manufacturing cost will be reduced, and at the same time, the variation of attracting force of the sheets will be decreased not only within any lot thereof but also between the lots. Consequently, quality assurance of the attracting sheets is made easier in the invention.

It is also to be noted that white or light gray-colored attracting sheets can be manufactured owing to the whiskers coated with the white conductive substance in the invention. This is a significant advantage which the known black sheets have never provided up to now. One of the merits will, for instance, be observed when thin lines are drawn on a transparent drawing sheet for an over-head projector(OHP). The thin lines can be inspected visually while they are drawn on an X-Y plotter which is attracting the drawing sheet.

BRIEF DESCRIPTION OF THE DRAWING

The invention will be described in more detail referring to the drawings, in which.

DESCRIPTION OF THE PREFERRED EMBODIMENT

Figure 1:
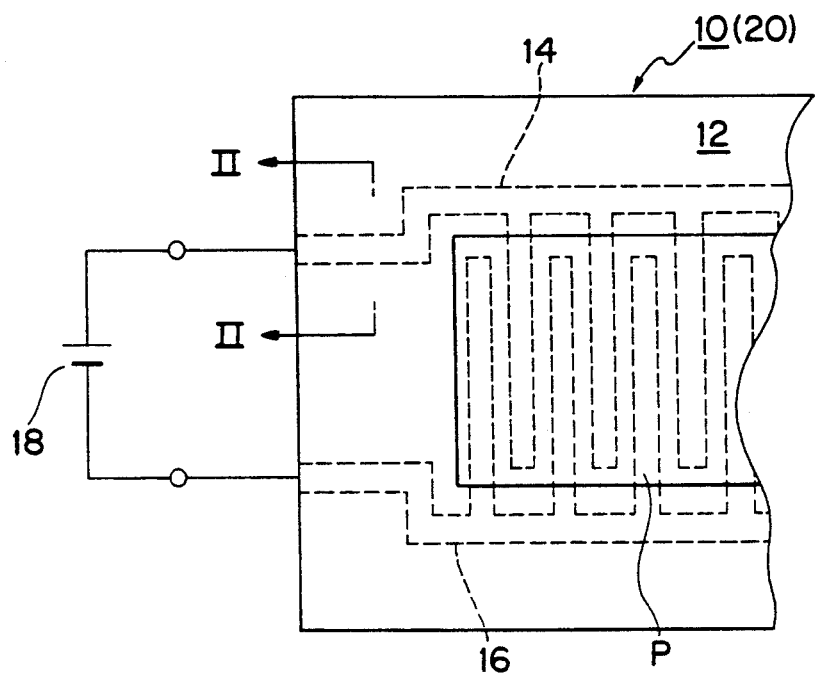
FIG. 1 is a schematic plan of an electrostatic holder employing an electrostatic attracting sheet which is provided in an embodiment.

In an embodiment shown in FIGS. 1, an electrostatic holder 10 comprises a plate 20 comprising an electrostatic attracting sheet 12. A positive electrode 14 and a negative electrode 16 are formed on a back side of the sheet and are of a comb-like shape and electrically connected to a power source 18 A drawing sheet of paper "P" is attracted to an upper surface of the sheet 12.

Figure 2:
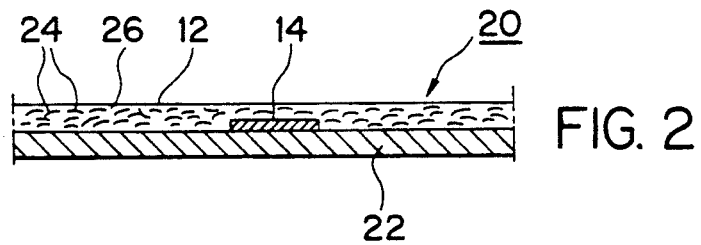
FIG. 2 is a cross section taken along a line II—II in FIG. 1.

As is shown in FIG. 2, the plate 20 comprises an insulating base 22 on which the electrodes 14 and 16 are formed. Each of comb-teeth portions of one electrode is disposed between and spaced apart from every two combteeth portions of the other electrode.

Bonded to surfaces of the electrodes and a free surface of the base 22 is the electrostatic attracting sheet 12. In other words, said sheet 12 covers the electrodes and the base.

The electrostatic attracting sheet 12 which is formed by the melt-extrusion method is about 0.3 mm in thickness and has a fine internal structure as shown in FIG. 2. Dispersed in a matrix of an insulating polyacetal resin 26 are crystal whiskers 24 made of potassium titanate and coated with a white conductive substance.

Figure 4:
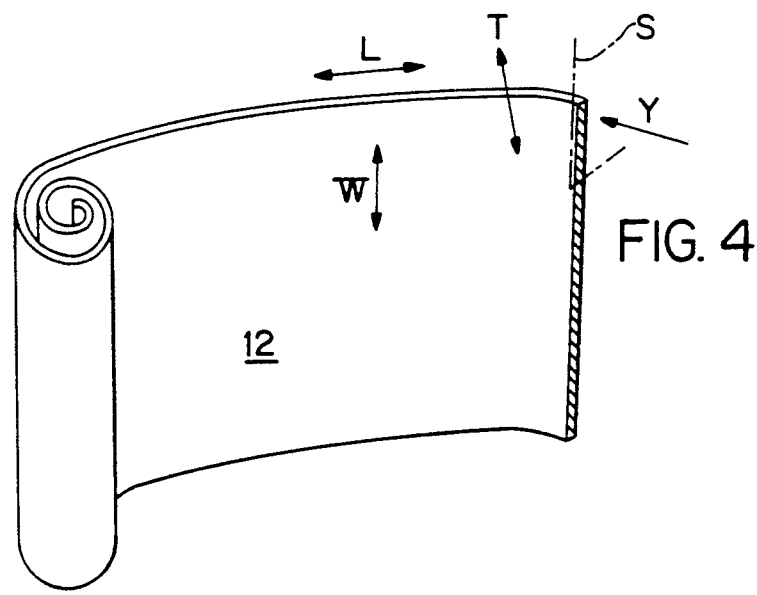
FIG. 4 is a schematic perspective view of the attracting sheet.
Figure 3:
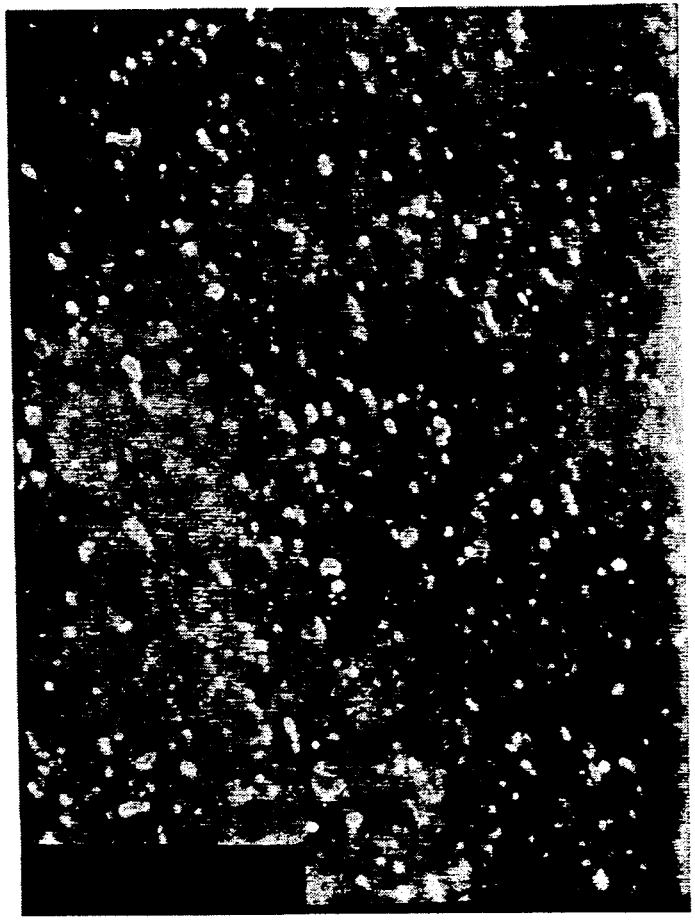
FIG. 3 is a photograph which was taken of the attracting sheet, in an electronic microscope.

Longitudinal axes of said whiskers are almost in parallel with the surface of said attracting sheet 12. An electronic microscope of scanning type was used to observe more finely a state of distribution of the whiskers 24. A photograph (shown in FIG. 3) at magnification of 3,000 was taken in the microscope with a specimen which was cut from the sheet 12 along a phantom line "S" in FIG. 4. Inspection and photographing were done in a direction shown by an arrow "Y".

As will be seen from the photograph, circular and rectangular bright dots which are about 1.5 mm in diameter are cross sections of the whiskers 24. It is apparent that said whiskers are arranged in the matrix with their longitudinal axes substantial parallel with a longitudinal direction "L" of the sheet 12. There is no significant alignment of said whiskers in a direction of thickness of said sheet 12. This brings about a volume resistivity lower in the longitudinal direction "L" than that in a transverse direction "W" and in the thickness direction "T". Such an anisotropy in the volume resistivity is effective to insulate the upper surface from the back surface of the attracting sheet. Therefore, human hands are protected from any significant electric shock even if said sheets are manufactured considerably thin.

The white and electrically conductive substance in the embodiment is tin which is coated at a ratio of about 1 part by weight to 2 parts by weight of the whiskers. The CVD(Chemical Vapor Deposition) method was utilized to deposit tin molecules on the whiskers.

The thus coated whiskers are about 0.2 to 0.5 $\mu m$ in diameter, and about 10 to 20 $\mu m$ in length.

Table 1 shows characteristics of electrostatic attracting sheets which were prepared in the embodiment by varying the content(%) by weight of white coated whiskers 24 in the sheets 12, within a range from 0% to 20%.

As seen from Table 1, volume resistivity of an order from $10^{12}\Omega.cm$ to $10^{14}\Omega.cm$ was imparted to the attracting sheets 12 with 2(two) to 8(eight) % by weight of the whiskers added in said sheets. A content higher than 8% by weight of whiskers is not desirable because the volume resistivity sharply decreases whereby an excessively high conductivity causes poor attracting force to the sheets 12.

TABLE 1

| | Examples of Attracting Sheets | | |
|---|---|---|---|
| Added amount of whiskers (wt. %) | Volume resistivity ($\Omega$ cm) | Bending modulus (kgf/cm$^2$) | Thermal deformation temp. (°C.) (18.6 kgf/cm$^2$) |
| 0 | 5.5 × 10$^{14}$ | 2.7 × 10$^4$ | 110 |
| 2 | 4.1 × 10$^{14}$ | 2.6 × 10$^4$ | 110 |
| 3 | 2.5 × 10$^{14}$ | — | — |
| 4 | 1.3 × 10$^{14}$ | — | — |
| 5 | 2.8 × 10$^{14}$ | 2.9 × 10$^4$ | — |
| 8 | 8.2 × 10$^{12}$ | 3.1 × 10$^4$ | 120 |
| 15 | 6.7 × 10$^{11}$ | 3.3 × 10$^4$ | 120 |
| 20 | 4.8 × 10$^{10}$ | — | — |
| Test method (ASTM) | D-257 | D-790 | D-648 |

Despite the same volume resistivity of the attracting sheets as that of the known conventional attracting sheets in which carbon black is dispersed, the attracting sheets in the embodiment proved to be much stronger in paper-attracting force than said known sheets.

Such a stronger attracting force is deemed to have resulted from the arrangement of the whiskers in the thinner plastics sheets (for instance, 0.3 mm in thickness which is remarkably smaller than 0.8 to 1.0 mm in the known attracting sheets), and also from the anisotropy in the volume resistivity caused by the whiskers which are almost in parallel with the surface of sheet.

It takes a longer time for the electrostatic charges in the invention to diminish after the electric connection of the sheets to the power source has been turned off. This phenomenon may be regarded to relate to the anisotropy, although an exact mechanism in unknown. Any way, it is desirable to employ in the electrostatic holder comprising the attracting sheet 12 such a control circuit that is adapted to reverse the polarity between the electrodes for a short instant before the power source is finally turned off.

The attracting sheets in the invention have a sufficient level of the bending modules, which enhances a higher durability of the sheets and a durable flatness thereof. The high temperature at which the attracting sheets deform makes it possible to select a temperature at which the electrodes are printed, within a wider range of temperatures.

What is claimed is:

1. An electrostatic attracting device for attracting a desired object through the use of a Coulomb's force comprising:
   a plastics sheet having conductive filler particles dispersed therein, the longitudinal axis of said filler particles being substantially in alignment with a direction in which a planar surface of said plastics sheet extends, said filler particles being crystal whiskers of potassium titanate, said crystal whiskers being coated with a white conductive substance; and
   an insulating layer upon which said plastics sheet is disposed;
   electrodes for applying an electric field to said plastics sheet to form an electrostatic charge therein to attract the desire object; said electrodes being interposed between said plastics sheet and said insulating layer and being adaptable for connection with a power source.

2. An electrostatic attracting device as set forth in claim 1 wherein said plastic sheet has a volume resistivity of an order of $10^{12}$ to $10^{14} \Omega.cm$.

3. The electrostatic attracting device as set forth in claim 1 wherein a diameter of said white coated crystal whiskers is in a range from about 0.2 to 0.5 $\mu m$, the length of said white coated crystal whiskers is in a range from about 10 to 20 $\mu m$, and a content of said white coated crystal whiskers is in a range from about 2 to 8% by weight of said plastics sheet so as to impart thereto a volume resistivity of an order of $10^{12}$ to $10^{14} \Omega.cm$.

4. The electrostatic attracting device as set forth in claim 1 or 3 wherein said white conductive substance is selected from a group consisting of tin, antimony and nickel.

5. The electrostatic attracting device as set forth in claim 4 wherein said white conductive substance is tin which is contained at about 30% to 40% by weight of the coated whiskers and coated 0.01 to 0.1 $\mu m$ thick.

6. The electrostatic attracting device as set forth in claim 1 or 2 wherein a diameter of said white coated crystal whiskers is in a range from about 0.2 to 0.5 $\mu m$, the length of said white coated crystal whiskers is in a range from about 10 to 20 $\mu m$, and a content of said white coated crystal whiskers is in a range from about 2 to 8% by weight of said plastics sheet.

7. The electrostatic attracting device as set forth in claim 6 wherein said white conductive substance is selected from a group consisting of tin, antimony and nickel.

8. The electrostatic attracting device as set forth in claim 7 wherein said white conductive substance is tin which is contained at about 30% to 40% by weight of the coated whiskers and coated 0.01 to 0.1 $\mu m$ thick.

9. The electrostatic attracting device as set forth in claim 2 wherein said white conductive substance is selected from a group consisting of tin, antimony and nickel.

10. The electrostatic attracting device as set forth in claim 9 wherein said white conductive substance is tin which is contained at about 30% to 40% by weight of the coated whiskers and coated 0.01 to 0.1 $\mu m$ thick.

* * * * *